United States Patent [19]

Nakamura et al.

[11] Patent Number: 5,659,807
[45] Date of Patent: Aug. 19, 1997

[54] VIBRATION COMPENSATION CAMERA HAVING REDUCED POWER CONSUMPTION IN A SELF-TIMER MODE AND A BULB MODE

[75] Inventors: Toshiyuki Nakamura, Tokyo; Tatsuo Amanuma, Ageo; Keishi Urata, Tokyo, all of Japan

[73] Assignee: Nikon Corporation, Tokyo, Japan

[21] Appl. No.: 377,066

[22] Filed: Jan. 23, 1995

[30] Foreign Application Priority Data

| Jan. 21, 1994 | [JP] | Japan | 6-005361 |
| Jan. 21, 1994 | [JP] | Japan | 6-005363 |
| Jan. 21, 1994 | [JP] | Japan | 6-005364 |

[51] Int. Cl.⁶ ............. G03B 17/00; G03B 5/00; G03B 5/02
[52] U.S. Cl. ............. 396/55; 396/439; 396/301
[58] Field of Search ............. 354/195.1, 267.1, 354/202, 238.1; 396/55, 439, 301

[56] References Cited

U.S. PATENT DOCUMENTS

| 5,146,263 | 9/1992 | Kataoka | 354/430 |
| 5,153,633 | 10/1992 | Otani | 354/430 |
| 5,172,150 | 12/1992 | Teramoto et al. | 354/202 |
| 5,192,964 | 3/1993 | Shinohara et al. | |
| 5,307,113 | 4/1994 | Egawa | 354/430 |
| 5,384,617 | 1/1995 | Kobayashi et al. | 354/419 |
| 5,416,554 | 5/1995 | Hamada et al. | 354/400 |
| 5,416,558 | 5/1995 | Katayama et al. | 354/446 |

FOREIGN PATENT DOCUMENTS 4-301822  10/1993  Japan.

*Primary Examiner*—Michael L. Gellner
*Assistant Examiner*—Daniel Chapik

[57] ABSTRACT

A vibration compensation camera to correct image vibration occurring due to camera vibration by driving a vibration compensation lens according to vibration detected by a vibration detection circuit. The vibration compensation camera also includes a delay mode setting device to set a time delay to perform a shutter opening operation after a predetermined time has elapsed after a release operation. When the delay mode setting device is set to the delay mode, the vibration compensation system is not operated, thereby reducing electric power consumption. The vibration compensation camera may also have a bulb mode function to perform photography while in a bulb mode. A bulb mode setting device sets a bulb mode to maintain a camera shutter in an open state. When the bulb mode setting device is set to the bulb mode, the vibration compensation system is not operated. The vibration compensation camera may also have a timed delay function to start the vibration detection circuit after a first delay time has elapsed from a release operation and to perform a shutter opening operation after a second delay time has elapsed from the release operation.

14 Claims, 10 Drawing Sheets

VIBRATION COMPENSATION CAMERA HAVING REDUCED POWER CONSUMPTION IN A SELF-TIMER MODE AND A BULB MODE

BACKGROUND OF THE INVENTION

1. Field of the Invention

The present invention relates to a vibration compensation camera having a vibration compensation system to correct vibration of an image caused by hand tremor and the like during photography, and, more particularly, to a vibration compensation camera having a self-timer mode or a bulb mode, which prevents excess power consumption by the vibration compensation system when the camera operates in the self-timer mode or a bulb mode.

2. Description of the Related Art

Vibration compensation cameras are known having vibration compensation mechanisms to correct for the effects of vibration caused by hand tremor and the like during photography. The known types of vibration compensation cameras include vibration detection circuits arranged within the camera to detect vibration. When vibration is detected by the vibration detection circuits, a compensation lens arranged as a portion of the photographic lens system is moved during the time that a camera shutter is open, based on the output of the vibration detection circuits. The compensation lens is moved in a direction approximately at right angles to the optical axis to negate the vibration. Further, the known vibration compensation cameras also include various camera accessory mechanisms, such as a self-timer mechanism to effect photography after a predetermined time period has elapsed from a release operation, and a bulb function or bulb mode, which is a known camera setting in which the shutter can be opened by initiating the release operation and closed when the release operation is ended, to maintain an optional time for a shutter open state.

However, in the known type of vibration compensation camera including a self-timer mode and mechanism, the following problems arise. Firstly, when the vibration detection circuits are started at the beginning of a photographic process and operate during the time interval beginning from the release action until a photograph is taken, and the vibration detection circuitry remains in a conductive state during photography in the self-timer mode, the power consumption becomes large. Secondly, when photography is performed in the self-timer mode the probability that vibration will arise is small since the camera is usually fixed, e.g., on a tripod. Thus, it is wasteful to operate the vibration compensation function at such a time. Thirdly, when the vibration compensation function is not operated, the vibration compensation lens remains housed at its initial position, and thus is in a position displaced from the center of the optical axis. As a result of the position of the vibration compensation lens, the photographic result becomes inferior.

Further, although it is usually wasteful to start the Vibration detection circuits before necessary because their electric current consumption is large, the vibration detection circuits are not stable until a given time has elapsed after an electrical power source is applied. The vibration detection circuits also have the characteristic that normally a signal cannot be output until the circuits are stable. Because the time necessary until these circuits stabilize is generally 1-2 seconds, the vibration detection circuits start when the half-depression switch is set ON such that the vibration detection circuits are stable when the photographic process commences.

However, in the known vibration compensation camera including a self-timer mode, for the vibration detection circuits to start at the time of commencement of the photographic process during photography in the self-timer mode, the vibration detection circuits remain in a conductive state during the interval from the release operation until photography is carried out. As a result, the electric current consumption of the camera is large.

Further, in the known vibration compensation camera having a bulb mode to maintain an optional time for a shutter open state, when a vibration compensation process is performed in the bulb mode, the motor circuits which drive the vibration compensation lens remain in a conductive state for a long time, such that the electric current consumption of the camera becomes large, and excessive heat is generated by the motor circuits.

Still further, when the vibration compensation function does not operate, the vibration compensation mechanism is housed at an initial position at the end portion of its drive range, and is displaced from the optical axis center. The compensation lens is initially located at this position (1) to maintain the stroke amount during driving of the vibration compensation lens; (2) because lens position detection circuits detect only the amount of movement of the compensation lens, and (3) placing the compensation lens at the end portion of its drive range stabilizes the compensation lens.

Accordingly, when the vibration compensation process is not performed when in the bulb mode, the compensation lens becomes housed at the end portion of its movement range, and, as a result, the compensation lens is maintained in a state which is displaced from the center of the optical axis. Moreover, when performing optical system adjustment to set the positions of the optical system and film surface, shutter opening is performed in the bulb mode; however, a problem arises in that at this time the compensation lens is displaced from the optical axis, and the adjustment of the optical system cannot be accurately performed.

SUMMARY OF THE INVENTION

Accordingly, it is an object of the present invention to provide a vibration compensation camera having a self-timer mode, wherein a vibration compensation function is not performed when the camera is in the self-timer mode.

It is another object of the present invention to provide a vibration compensation camera having a bulb mode which reduces electric current consumption when the camera is in the bulb mode.

It is another object of the present invention to provide a vibration compensation camera having a bulb mode wherein photography and adjustment of the optical system can be performed in the bulb mode.

It is another object of the present invention to provide a vibration compensation camera having a self-timer mode which reduces electric current consumption of the vibration compensation mechanism when the camera is in the self-timer mode.

Additional objects and advantages of the invention will be set forth in the description which follows, and, in part, will be obvious from the description, or may be learned by practice of the invention.

Objects and advantages of the present invention are achieved in accordance with a first embodiment of the present invention with a vibration compensation camera having a vibration compensation system including a vibration compensation lens which is moved in a direction generally at right angles to an optical axis direction to correct image vibration caused by camera vibration. The vibration compensation camera includes a delay mode setting device to set time limit delay mode (i.e., self-timer mode) in which a shutter opening operation is performed at a predetermined time after release action, and a control unit to control the vibration compensation system such that when the delay mode setting device is set to the time limit delay mode, the vibration compensation lens is not moved. The vibration compensation system also includes a vibration detection circuit to detect vibration occurring in a direction approximately at right angles to the optical axis direction. The control unit controls the vibration detection circuit such that it does not perform vibration detection when the delay mode setting device is set to the time limit delay mode. The vibration compensation system further includes a centering device to move the vibration compensation lens from an initial position to the approximate center of the optical axis when the control unit inhibits the vibration compensation system from operating. The vibration compensation system also includes a changeover device to select whether or not the vibration compensation system operates. When the changeover device is set such that the vibration compensation system does not operate, the control unit controls the centering device to move the vibration compensation lens from an initial position to the approximate center of the optical axis.

In accordance with the first embodiment of the invention, when the time limit delay mode is set, the vibration compensation system does not operate. Accordingly, there is no electric current consumption due to the vibration compensation operation during the time limit delay mode. Further, the vibration detection circuit does not operate when the time limit delay mode is set. Accordingly, there is no electric current consumption due to the operation of the vibration detection circuit during the time limit delay mode. When the vibration compensation system is not operated because the time limit delay mode is set, the vibration compensation lens is moved to the approximate center of the optical axis. Accordingly, when the vibration compensation system does not operate, the vibration compensation lens is located in a standard position. When the changeover device is set so that the vibration compensation system does not operate, the vibration compensation lens is moved to the approximate center of the optical axis. Accordingly, when the vibration compensation system does not operate, the vibration compensation lens is positioned in a standard position.

Objects and advantages of the present invention are achieved in accordance with a second embodiment of the invention with a vibration compensation camera having a vibration compensation system including a vibration compensation lens which is moved in a direction generally at right angles to an optical axis direction to correct image vibration caused by camera vibration. The vibration compensation camera in accordance with the second embodiment also includes a vibration detection circuit to detect vibration arising in a direction approximately at right angles to the optical axis, a delay mode setting device to set a first time limit delay and a second time limit delay and a timing device to perform time measurement. A control unit causes operation of the timing device simultaneously with a release operation when the delay mode setting device is set to the time limit delay mode. After a first time delay has elapsed, the vibration detection circuit is operated. After a second time delay has elapsed, photography is commenced. The second time delay, which is timed by the timing device, may be shorter than the first time delay.

In accordance with the second embodiment of the present invention, when performing photography in the time limit delay mode, at the time of photography, the vibration detection circuit is not operated at the same time as the release operation, but operates after a first time delay has elapsed from the release operation. Accordingly, the electric current consumption by the vibration detection circuit can be minimized by the first time delay in starting the vibration detection circuit, while a time required for stabilization of the vibration detection circuit can be maintained by the second time delay.

Objects and advantages of the present invention are achieved in accordance with a third embodiment of the present invention with a vibration compensation camera having vibration compensation system to move a vibration compensation lens in a direction generally at right angles to the optical axis direction to correct image vibration caused by camera vibration, and a bulb mode setting device to set a bulb mode to maintain a camera shutter in an open state. When the bulb mode setting device is set to the bulb mode, the vibration compensation system is controlled such that it does not operate and the vibration compensation lens is not moved. The vibration compensation camera in accordance with the third embodiment of the invention also includes a centering device to move the vibration compensation lens from an initial position to the approximate center of the optical axis when the bulb mode setting device is set to the bulb mode.

In accordance with the third embodiment, when the bulb mode is set, the vibration compensation system does not operate, and there is no large electric current consumption due to conduction for an extended time, nor heat generation by the circuits. Furthermore, in accordance with the third embodiment, since the vibration compensation lens is moved to approximately the center of the optical axis when the bulb mode is set, even though the initial position of the vibration compensation lens is displaced from the optical axis, good photography can be performed in the bulb mode. Furthermore, accurate adjustment of the optical system can be performed.

BRIEF DESCRIPTION OF THE DRAWINGS

These and other objects and advantages of the present invention will become apparent and more readily appreciated from the following description of the preferred embodiments taken in conjunction with the accompanying drawings, of which.

DESCRIPTION OF THE PREFERRED EMBODIMENTS

Figure 1:
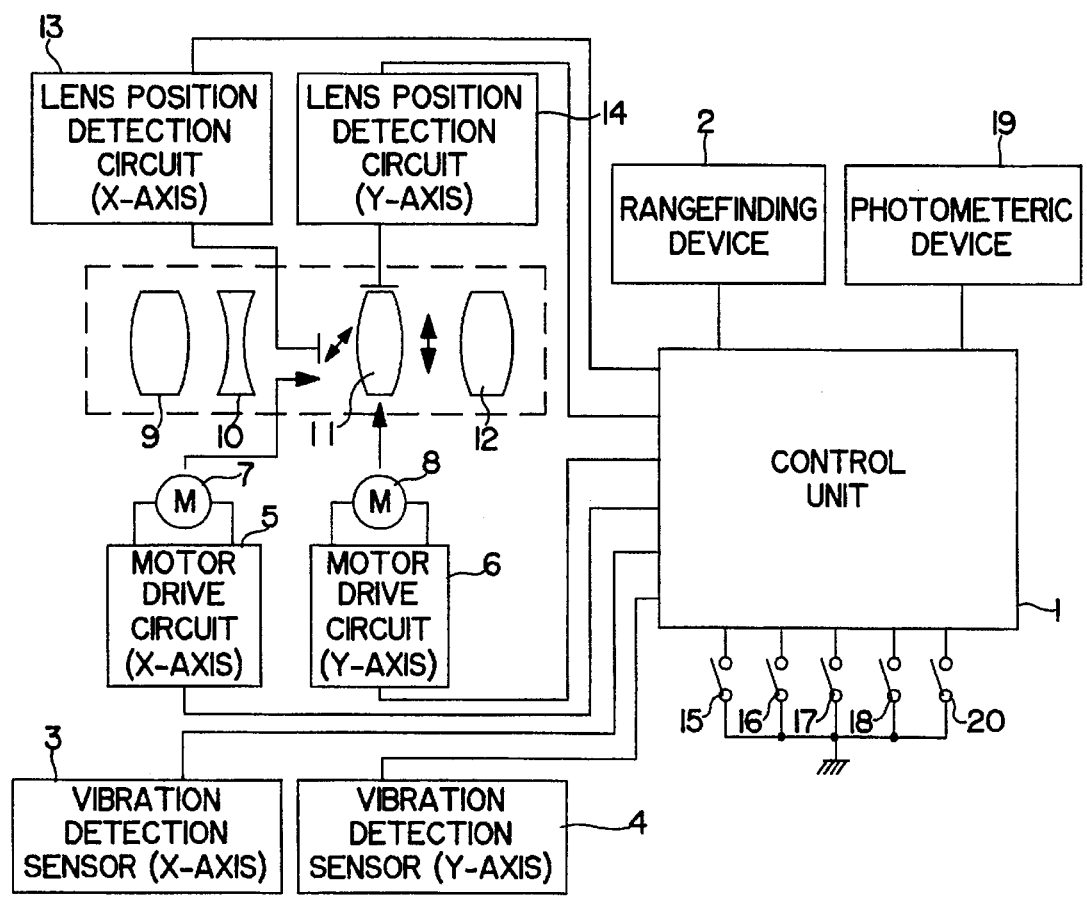
FIG. 1 is a block diagram showing a camera with a vibration compensation system in accordance with a first embodiment of the present invention.

Reference will now be made in detail to the preferred embodiments of the present invention, examples of which are illustrated in the accompanying drawings, wherein like reference numerals refer to like elements throughout.

FIG. 1 is a block diagram showing a camera having a vibration compensation system in accordance with a first embodiment of the present invention. As shown in FIG. 1, the camera vibration compensation system includes a compensation lens 11 which is part of a photographic optical system having four lenses 9, 10, 11, 12. During focusing, the four lenses 9, 10, 11, 12 are driven together in a direction of the optical axis of the photographic optical system. During vibration compensation, only the compensation lens 11 is driven in a direction which is approximately perpendicular to the optical axis direction (where the X-axis is the horizontal direction, and the Y-axis is the vertical direction). Before vibration compensation is performed, the compensation lens 11 is first driven approximately to a center position (centering) of the photographic optical system, and when vibration compensation is not performed (i.e., when there is no camera vibration) the compensation lens 11 remains positioned at the center position of the photographic optical system.

A control unit 1, which preferably comprises a one-chip microcomputer, controls all camera functions. The control unit 1 includes a counter function, a timer function for keeping time, and an A/D conversion function. Electrically connected to the control unit 1 are a rangefinding device 2 to perform a rangefinding process, a photometric device 19 to perform a photometric process, a main switch 15 for starting camera operations, a half-depression switch 16 which is switched ON when a release button (not shown) is pressed halfway, a release switch 17 which is switched ON when the release button is pressed fully, a self-timer switch 18 which acts as a delay mode setting device and selects a self-timer mode, and a changeover switch 20 which is used to manually switch whether or not vibration compensation processing is performed.

The main switch 15 may be switched to one of an ON position and an OFF position. When the main switch 15 is switched to the ON position, camera operations are started and the main switch 15 is maintained in the ON position until it is returned to the OFF position. A display, such as an LCD (not shown), indicates whether or not the self-timer mode is selected by self-timer switch 18.

Vibration detection circuits 3 and 4, motor drive circuits 5 and 6, and lens position detection circuits 13 and 14 are also electrically connected to the control unit 1. Further, motors 7 and 8 are connected to the motor drive circuits 5 and 6, respectively. The vibration detection circuits 3 and 4 may be angular velocity detection circuits which detect angular velocity generated by camera vibration in the X-axis and Y-axis directions, respectively, and output values which correspond to the magnitude of the detected angular velocity. The control unit 1 performs A/D conversion on the values output by the vibration detection circuits 3 and 4, and computes the angular velocity of camera vibration in the X-axis and Y-axis directions. The control unit 1 then transmits drive direction signals indicating a drive direction, and also transmits drive duty signals indicating a drive speed to motor drive circuits 5 and 6 which drive motors 7 and 8, respectively, according to these signals. The rotation of motors 7 and 8 is converted to linear motion by a mechanical part of the vibration compensation system, and the motors 7 and 8 drive the compensation lens 11 in the X-axis and Y-axis directions, respectively.

Lens position detection circuits 13 and 14 output pulse signals according to the amount by which the compensation lens 11 is driven in the X-axis and Y-axis directions, respectively. The control unit 1 reads the positions and the amounts of movement in the X-axis and Y-axis directions by counting the number of pulses output by the lens position detection circuits 13 and 14. Moreover, the control unit 1 computes the speed of movement of the compensation lens 11 in the X-axis and Y-axis directions from the amount of movement during a fixed period of time.

Figure 2:
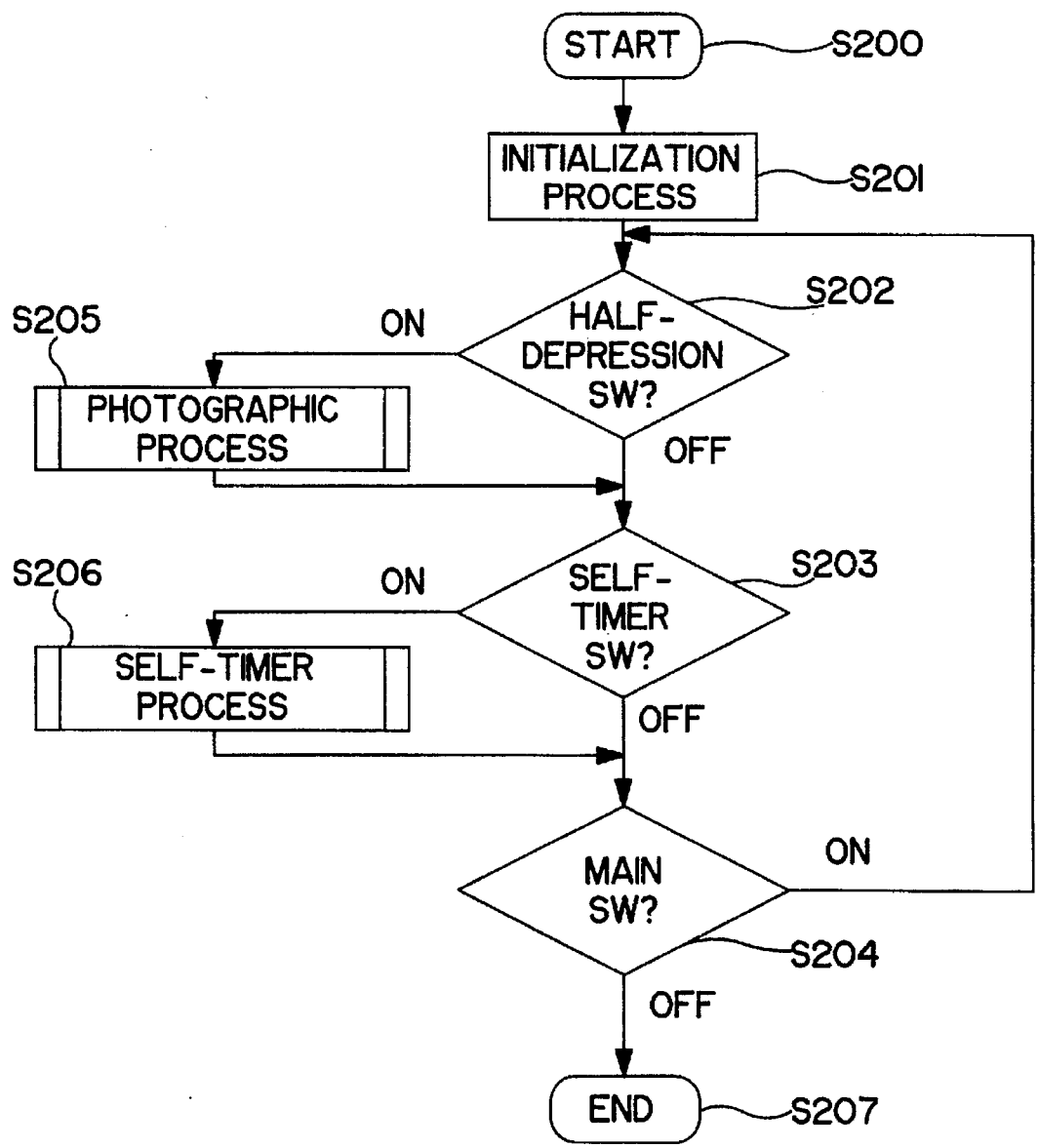
FIG. 2 is a flow chart showing an operational process for performing photography with a camera having a vibration compensation system and a self-timer function in accordance with embodiments of the present invention.

FIG. 2 is a flow chart showing an operational process for performing photography in a camera having a vibration compensation system in accordance with embodiments of the present invention.

Processing is started (step S200) when the main switch 15 is switched ON and power is supplied to camera components. The control unit 1 is then initialized (step 201) and a loop including steps S202, S203 and S204 is entered waiting for the half-depression switch 16 to be switched ON, the self-timer switch 18 to be switched ON, or the main switch 15 to be switched OFF, respectively. In step S202, when the half-depression switch 16 is ON, a photographic process is commenced (step S205). If the half-depression switch is not ON, the operational process proceeds to step S203 where it is determined whether the self-timer switch 18 is ON. If the self-timer switch 18 is ON, the operational process proceeds to step S206, and a self-timer setting process is commenced. If the self-timer switch 18 is not ON, the operational process proceeds to step S204 where it is determined whether the main switch 15 is ON. If the main switch 15 is ON, the operational process returns to step S202. When the main switch 15 is switched OFF, the operational process ends (step S207).

Figure 3:
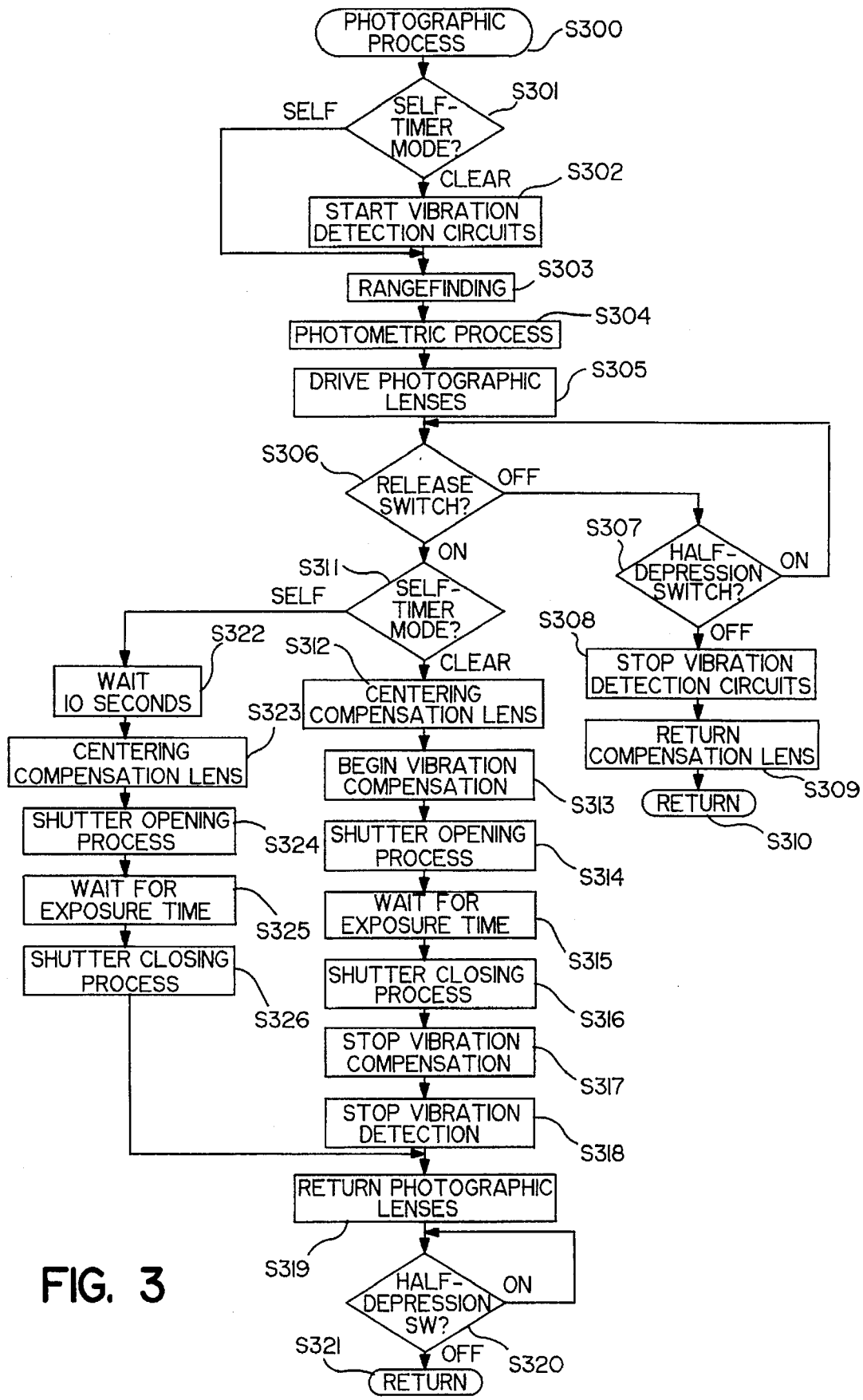
FIG. 3 is a flow chart showing an operational process corresponding to the photographic process performed in step S205 of FIG. 2 in accordance with the first embodiment of the present invention.

FIG. 3 is a flow chart showing an operational process corresponding to the photographic process performed in step S205 of FIG. 2 in accordance with the first embodiment of the present invention. After the photographic process is started in step S300, it is determined whether or not the self-timer mode has been set (step S301). When the self-timer mode is not set, the vibration detection circuits 3 and 4 are started (step S301). The vibration detection circuits 3 and 4 are not started directly before the vibration compensation process (step S313), but are started at this point in the operational process because by starting the vibration detection circuits 3 and 4 early, they are allowed to stabilize.

When the self-timer mode is not set in step S301, the operational process proceeds to step S303, by-passing step S302. In this manner, the vibration detection circuits 3 and 4 are not started when in the self-timer mode, and no electric current consumption by the vibration detection circuits 3 and 4 occurs because vibration compensation is not performed in the self-timer mode.

Next, rangefinding processing (step S303) is performed by the rangefinding device 2, and photometric processing (step S304) is performed by the photometric device 19. The photographic lens system 9–12 is then driven (step S305) into predetermined focused positions based on the rangefinding result of step S303.

It is then determined (step S306) whether the release switch 17 is ON or OFF. When the release switch 17 is OFF, it is determined (step S307) whether the half-depression switch 16 is ON or OFF. When the half-depression switch 16 is ON, the operational process returns to step S306. When the half-depression switch 16 is OFF, the operation of the vibration detection circuits 3 and 4 is stopped (step S308), the photographic lens system 9–12 is returned to its initial position (step S309) and the operational process returns (step S310) to the flow chart shown in FIG. 2 (no photography is performed).

When it has been determined in step S306 that the release switch 17 is ON, the operational process proceeds to step S311 and it is determined whether or not the self-timer mode is set. When the release switch 17 is ON in step S306 and the self-timer mode is not set, normal photography is performed beginning at step S312.

In step S312, a process of centering the compensation lens 11 is performed. Specifically, the compensation lens 11 is driven to a standard position of the optical axis center. The compensation lens 11 is located, in its initial state, at a position displaced from the optical axis center at the end portion of its drive range. The compensation lens 11 is initially located at this position (1) to maintain the stroke mount during driving the compensation lens 11; (2) because the lens position detection circuits 13 and 14 detect only the mount of movement of the compensation lens 11; and (3) placing the compensation lens 11 at the end portion of its drive range stabilizes the compensation lens 11.

Continuing in step S313, vibration compensation processing is started. In particular, based on the output results of the vibration detection circuits 3 and 4, the compensation lens 11 is moved in a direction approximately at right angles to the optical axis to negate the vibration detected by the vibration detection circuits 3 and 4. When the vibration compensation process is commenced, a shutter (not shown) opening and closing operation is performed. The shutter is opened (step S314) and after waiting (step S315) for a predetermined exposure time based on the photometric result of step S304, the shutter is closed (step S316). The vibration compensation process is then stopped (step S317), the operation of the vibration detection circuits 3 and 4 is stopped (step S318), and the operational process proceeds to step S319.

When the release switch 17 is set ON in step S306 and the self-timer mode is set in step S311, photography has begun in the self-timer mode (step S322). In step S322, a 10 second delay is performed. The timing of a 10 second interval is performed by the timer function of the control unit 1. When the 10 second interval ends, a process of centering the compensation lens 11 is performed (step S323) in a manner similar to that performed in step S312. Centering of the compensation lens 11 is performed, even when the vibration compensation process is not performed when in the self-timer mode, to move the compensation lens 11 from its initial position to a standard position at the optical axis center. Accordingly, because of the centering process, good photographic results are obtained when in the self-timer mode.

Next, the shutter is opened and closed (steps S324–S326) in a manner similar to that performed in steps S314–S316. In step S326, when the shutter is closed, the operational process proceeds to step S319.

The photographic lens system 9–12 is then returned (step S319) to the initial position on the optical axis (return process), and further, the compensation lens 11 returns to its initial position at the end portion of its drive range. Next, in step S320, when it is determined that the half-depression switch 16 is OFF, the operational process returns (step S321) to the flow chart of FIG. 2.

Figure 4:
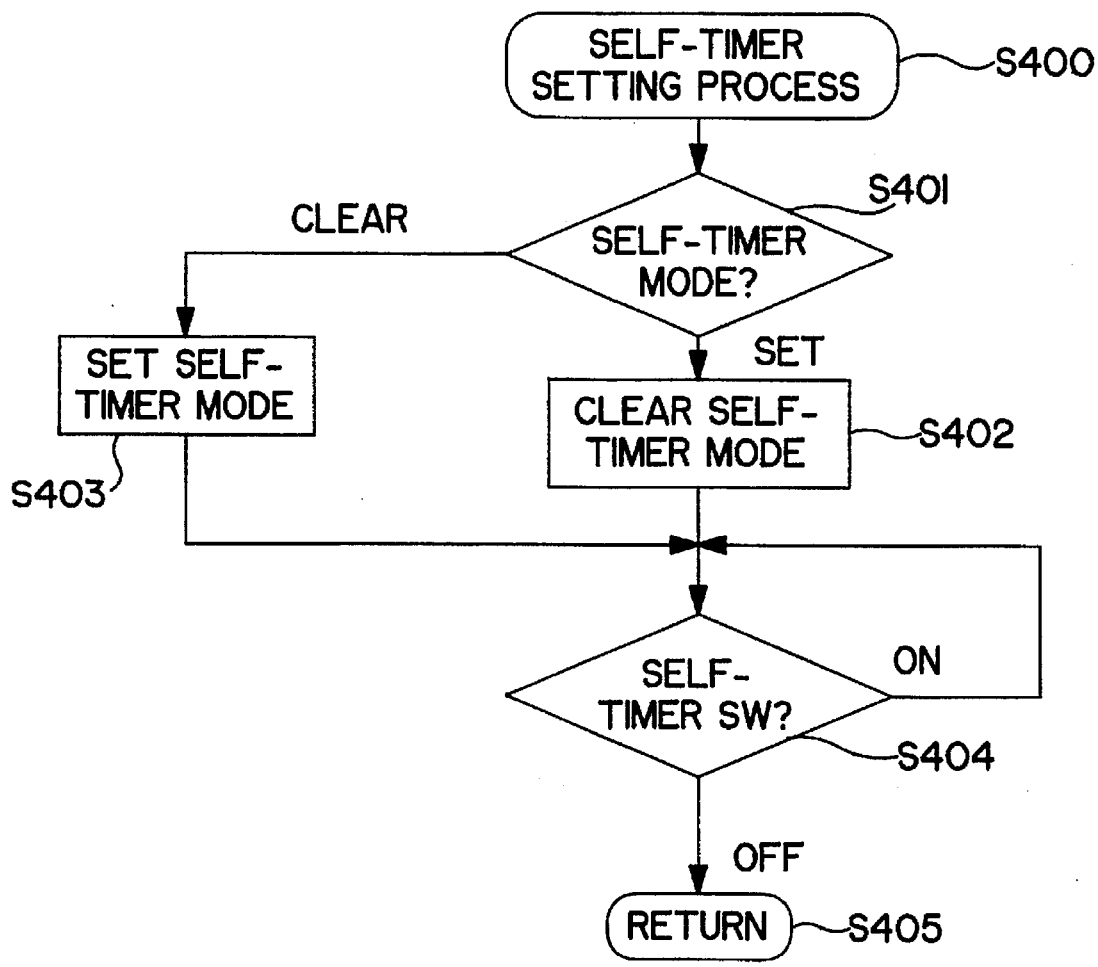
FIG. 4 is a flow chart showing an operational process corresponding to the self-timer setting process performed in step S206 of FIG. 2 in accordance with embodiments of the present invention.

FIG. 4 is a flow chart showing an operational process corresponding to the self-timer setting process performed in step S206 of FIG. 2 in accordance with the first embodiment of the present invention. The self-timer setting process begins in step S400 and, in step S401 it is determined whether or not the self-timer mode has already been set. When the self-timer mode has already been set, the self-timer mode is cleared (step S402). On the other hand, when the self-timer mode is cleared in step S401, the self-timer mode is then set in step S403. Specifically, when the self-timer switch 18 is ON, and the self-timer mode has already been set, the self-timer mode is cleared; when the self-timer mode is cleared in step S401, the self-timer mode is then set. Next, proceeding to step S404, when it is recognized that the self-timer switch 18 is OFF, the operational process returns from step S405 to the flow chart of FIG. 2.

Figure 5:
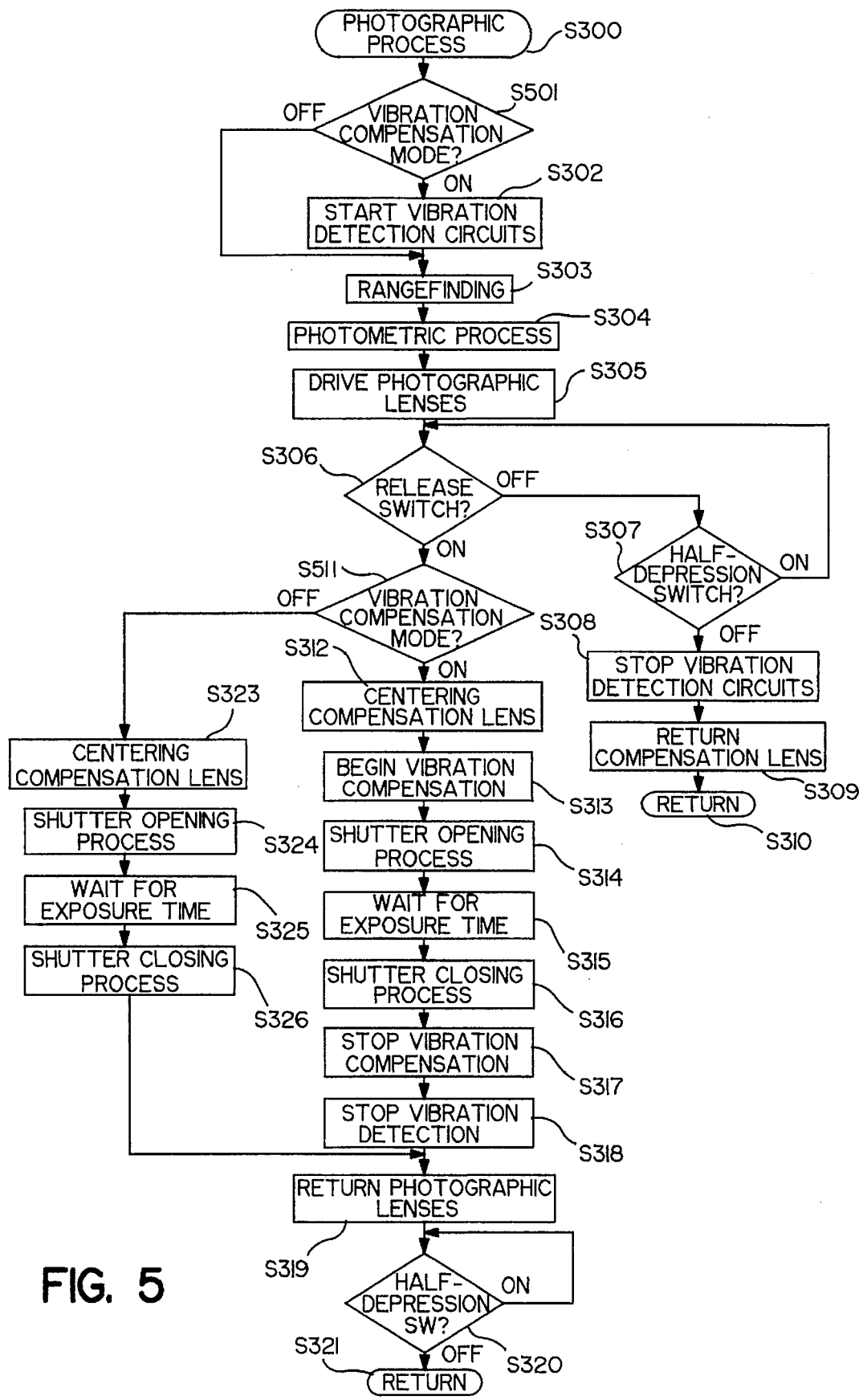
FIG. 5 is a flow chart showing an operational process corresponding to the photographic process performed in step S205 in accordance with the first embodiment of the present invention.

FIG. 5 is a flow chart showing an operational process corresponding to the photographic process performed in step S205 of FIG. 2 in accordance with the first embodiment of the present invention. In FIG. 5, steps which are the same as or similar to those set forth in the flow chart of FIG. 3 are referred to by the same reference numbers, and a detailed description of these like steps will not be repeated here.

In step S501, when the changeover switch 20, which selects the vibration compensation mode, is OFF, the operational processes of steps S303–S305 are performed, by-passing step S302 such that the vibration detection circuits 3 and 4 do not start. Next, when the release switch 17 is ON in step S306, it is determined (step S511) whether the changeover switch 20 is ON or OFF. When the changeover switch 20 is OFF, proceeding to step S323, the process of centering the compensation lens 11 is performed. In this manner, centering of the compensation lens 11 is performed even when the vibration compensation mode is not selected, and good photographic results are obtained. Thus, in accordance with the operational process performed in the flow chart of FIG. 5, when the changeover switch 20 is OFF, photography is performed without performing vibration compensation.

It will be recognized that the first embodiment of the present invention is not limited to the above-described configuration, and various modifications are possible without departing from the scope and spirit of the invention. For example, in accordance with the first embodiment, a so-called single self-timer mode is provided wherein after 10 seconds have elapsed, one frame of photography is carried out; however, the present invention can also be applied to a vibration compensation camera provided with a continuous self-timer mode in which plural frames are continuously photographed at predetermined time intervals. Furthermore, in the above-described first embodiment, the time delay of the self-timer mode is set to 10 seconds, but the time delay in the self-timer mode is not limited to this value and various delay times may be selected.

Therefore, in accordance with the vibration compensation camera of the first embodiment of the present invention, because a vibration compensation process is not performed when a self-timer mode is set, electric current consumption may be reduced and battery power may be saved. Further, since the vibration detection circuits are not operated when the self-timer mode is set, energy consumption may be further reduced. Finally, because a process of centering the vibration compensation lens is carried out even when the vibration compensation process is not performed, the optical system is located in a predetermined position, and normal photographic results can be obtained.

Second Embodiment

The vibration compensation system for a camera in accordance with the second embodiment of the present invention is the same as the vibration compensation system shown in FIG. 1, except that the changeover switch 20 is not included in the vibration compensation system of the second embodiment.

Further, in accordance with the second embodiment, the stabilization time of the vibration detection circuits 3 and 4 is about two (2) seconds, the drive time of the compensation lens 11 is one (1) second, the rangefinding time is 500 ms, the photometric time is 200 ms, the centering time of the compensation lens is 500 ms, and the delay time for the self-timer mode is 10 seconds.

The operational process for performing photography in accordance with the second embodiment of the present invention is the same as that described with respect to the first embodiment and shown in FIG. 2. Accordingly, a description of this operational process will not be repeated here.

Figure 6:
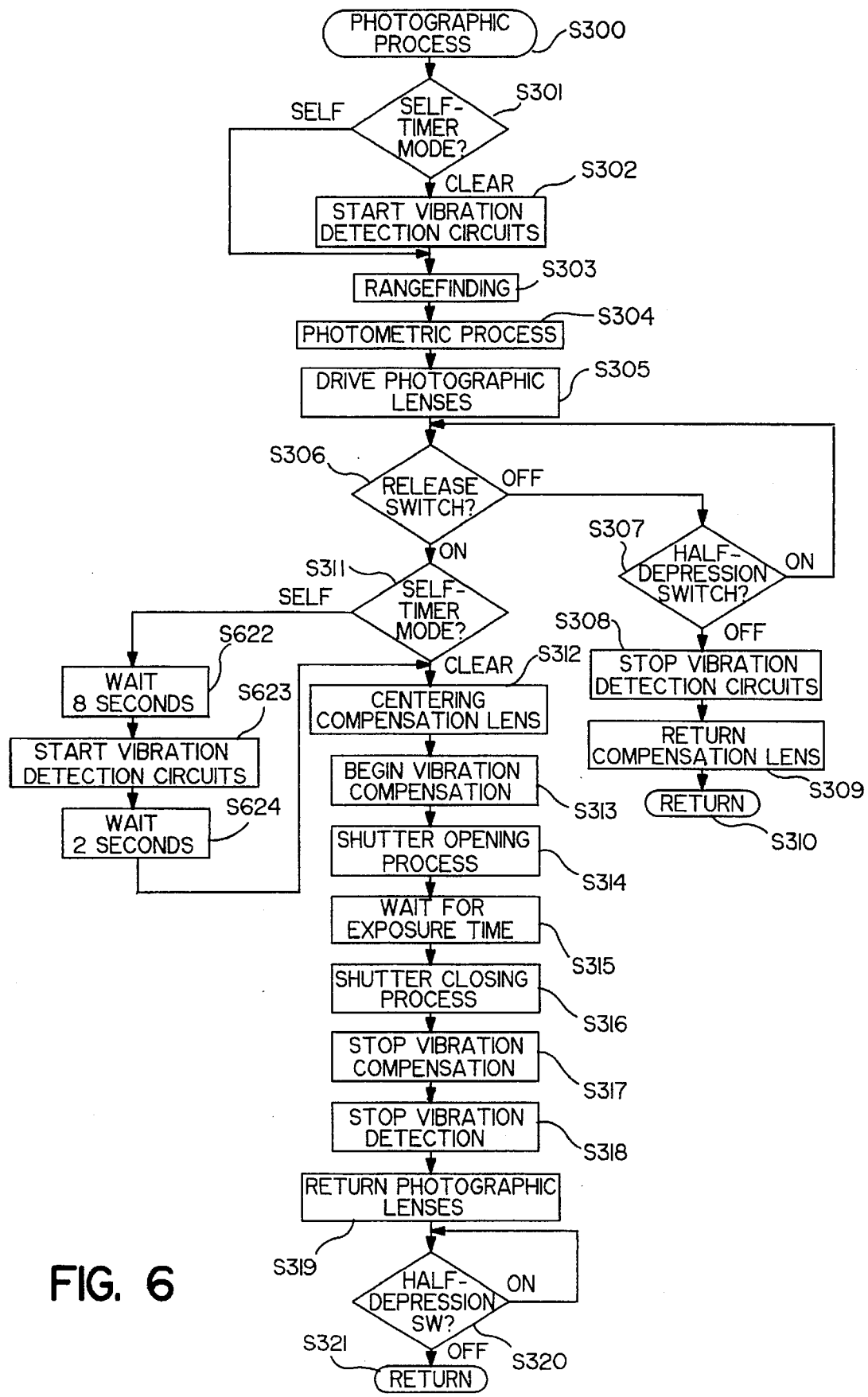
FIG. 6 is a flow chart showing an operational process corresponding to the photographic process of step S205 of FIG. 2 in accordance with the a second embodiment of the present invention.

FIG. 6 is a flow chart showing an operational process corresponding to the photographic process of step S205 in FIG. 2 in accordance with the second embodiment of the present invention. The steps in the flow chart of FIG. 6 which are the same as or similar to the steps performed in the flow chart of FIG. 3 are referred to by the same reference numerals. A detailed description of these like steps will not be repeated here.

In step S311, when the self-timer mode is set, and when the release switch 17 has been set ON in step S306, proceeding to step S622, photography is performed in the self-timer mode. In step S622, a delay of eight (8) seconds is performed. When the eight (8) second delay time ends, the vibration detection circuits 3 and 4 are started (step S623). Next, a delay of two (2) seconds is performed (step S624). The total time delay of steps S622 and S623 is equal to the self-timer time delay (in this example 10 seconds). After the two (2) second delay (step S624), photography is commenced (step S312) in a manner similar to that described above with reference to FIG. 3. The timing of the delays in steps S622 and S624 is performed by the timer function of control unit 1.

During the self-timer time delay, a total of 2.5 seconds elapses from the start of the vibration detection circuits 3 and 4 (step S623) until the vibration compensation process (step S313) is commenced (i.e., two (2) seconds in step S624 and 500 ms in step S312 for centering the compensation lens 11). Moreover, during normal photography, from the start of the vibration detection circuits 3 and 4 in step S302, to the commencement of the vibration compensation process in step S313, 500 ms are required in step S303, 200 ms are required in step S304, one (1) second is required in step S305, and 500 ms are required in step S312, for a total of 2.2 seconds. Accordingly, in any mode, the time required for the vibration detection circuits 3 and 4 to stabilize is maintained. Furthermore, because a delay time longer than that described above is not necessary, no useless electric current consumption occurs.

A modification of the second embodiment will now be described in which remote control photography is carried out. Firstly, in FIG. 1, a receiving unit (not shown) is electrically connected to the control unit 1 to receive information transmitted from a transmission unit (not shown) of the remote control. Remote control photography is performed when the receiving unit receives information. The delay time of the self-timer mode for remote control photography in accordance with the modification of the second embodiment is three (3) seconds.

In FIG. 6, a remote control photographic process begins in step S300, and the operational process is performed in the same manner as described above in steps S301–S305. In step S311, when it is determined that the self-timer mode is not set, normal photography is performed in a manner similar to step S312 and thereafter. However, when it is determined in step S311 that the self-timer mode is set, in step S622, a delay of about one (1) second is performed. After the one (1) second delay has elapsed, the vibration detection circuits 3 and 4 are started in step S623, and in the next step S624, a delay of two (2) seconds is performed, and the operational process continues in S312. In the above-described manner, even in remote control photography, a delay time of 2.5 seconds is arranged from the starting of the vibration detection circuits 3 and 4 to the commencement of the vibration compensation process (step S313), and the vibration detection circuits 3 and 4 are allowed to stabilize.

It will be recognized that the second embodiment of the present invention is not limited to that described above, and various modifications are possible without departing from the scope and spirit of the invention. For example, in accordance with the second embodiment the time until the vibration detection circuits 3 and 4 stabilize is 2.2 seconds or 2.5 seconds. However, the second embodiment is not limited to these values, and different values chosen according to the characteristics of the vibration detection circuits 3 and 4 may be selected. Further, a value of 10 seconds, which is the delay time when in the self-timer mode, and of three (3) seconds, which is the delay time when in the remote control mode, are given by way of example, and various values may be chosen for these delay times.

In accordance with the second embodiment of the present invention because the vibration detection circuits 3 and 4 are not operated from the release operation until after a first delay time has elapsed, electric current consumption by the vibration detection circuits can be made small. Further, since a second delay time elapses after the vibration detection circuits are started, the vibration detection circuits are allowed to stabilize.

Third Embodiment

Figure 7:
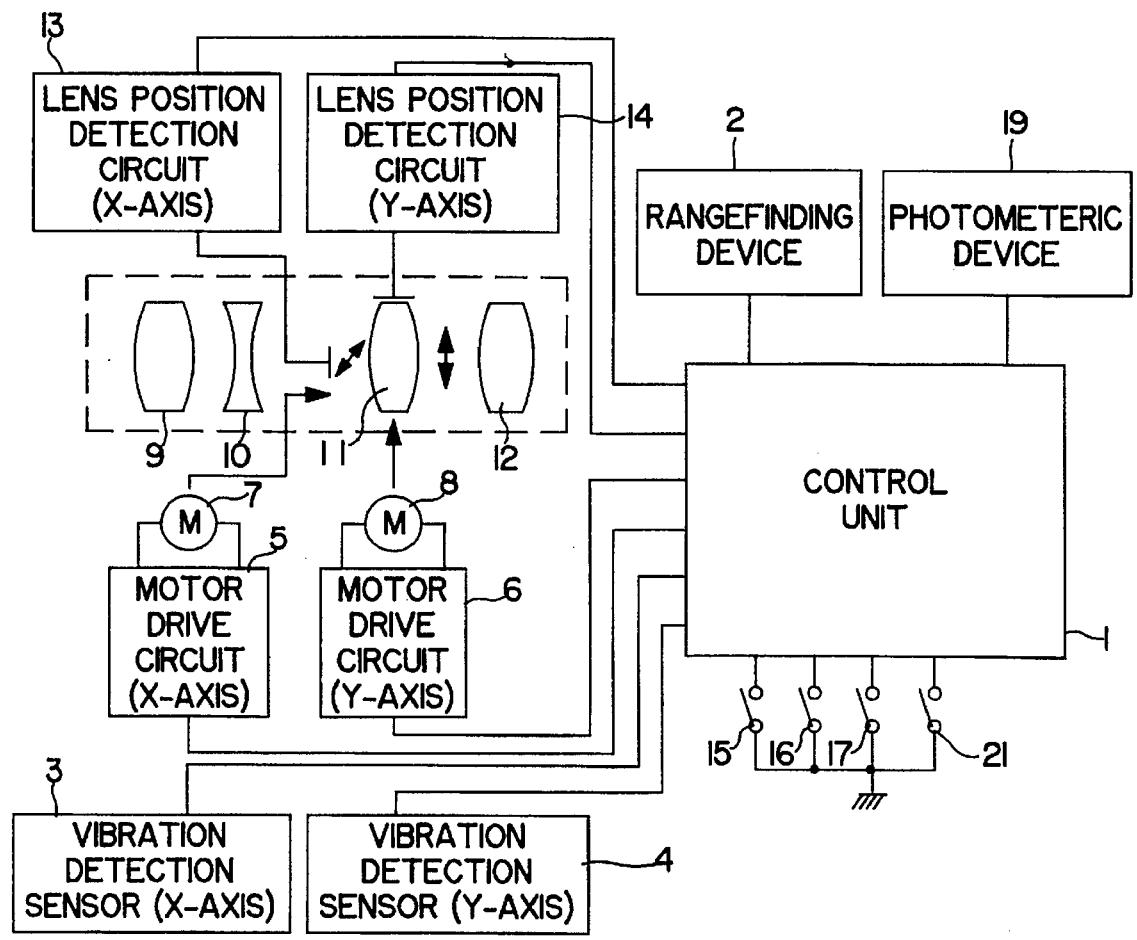
FIG. 7 is a block diagram showing a camera vibration compensation system in accordance with a third embodiment of the present invention.

A vibration compensation system in accordance with the third embodiment of the present invention is shown in FIG. 7. The vibration compensation system in accordance with the third embodiment is the same as that shown in FIG. 1, except that a bulb switch 21 is connected to the control unit 1, and the self-timer switch 18 and changeover switch 20 are not included in the vibration compensation system.

Figure 8:
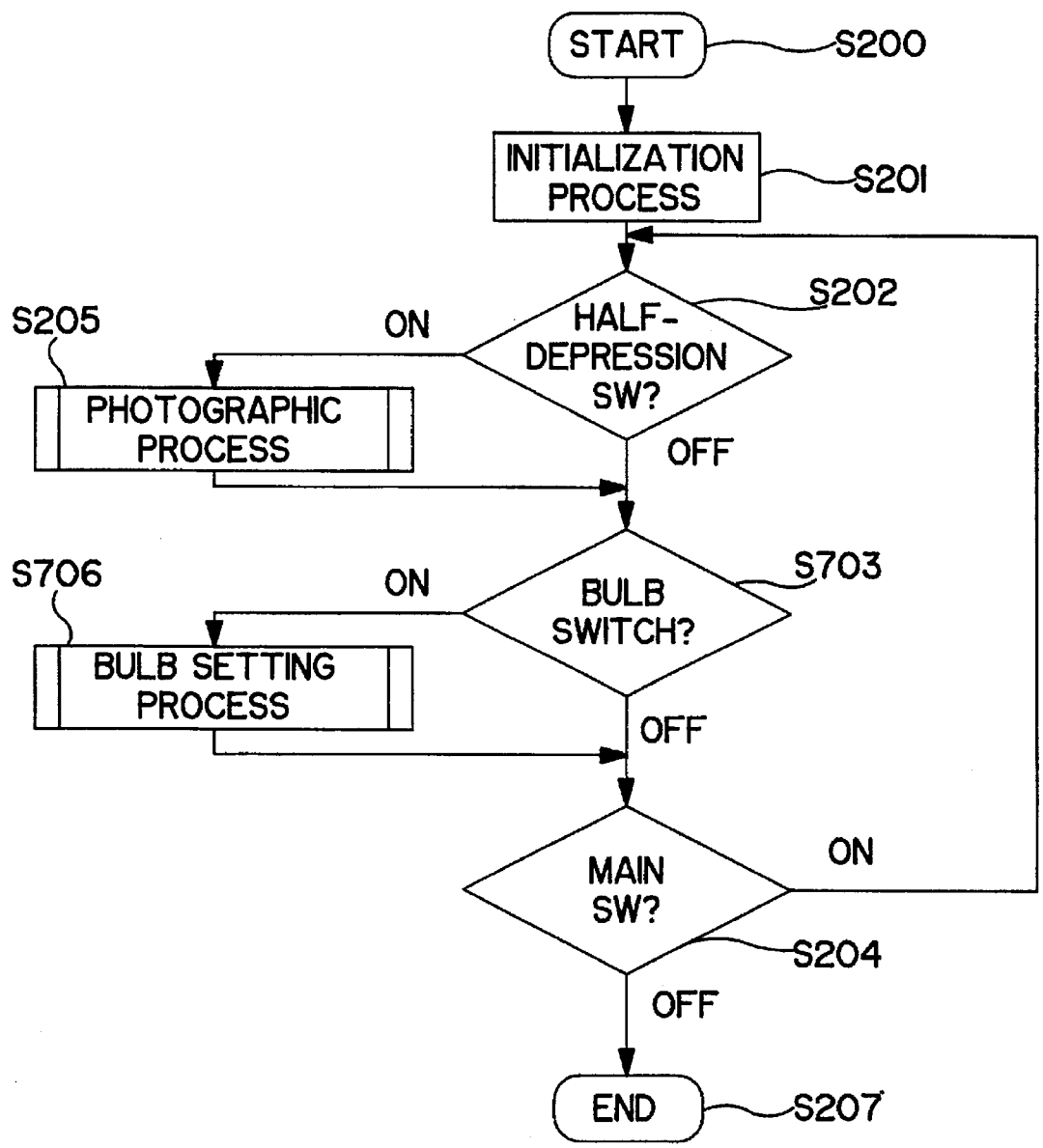
FIG. 8 is a flow chart showing an operational process for performing photography with a camera having a vibration compensation system and a bulb mode in accordance with the third embodiment of the present invention.

FIG. 8 is a flow chart showing an operational process for performing photography in a camera having a vibration compensation system including a bulb mode in accordance with the third embodiment of the present invention. The steps shown in FIG. 8 which are the same as or similar to the steps described with respect to the flow chart of FIG. 2 are referred to by the same reference characters and a detailed description of these like steps will not be repeated here.

In step S703 it is determined whether or not the bulb switch 21 is ON. If the bulb switch 21 is ON, the operational process proceeds to step S706, and a bulb mode setting process (described in detail below) is commenced. If the bulb switch 21 is OFF, the operational process proceeds to step S204 where it is determined whether the main switch 15 is ON or OFF in a manner similar to that described with reference to FIG. 2.

Figure 9:
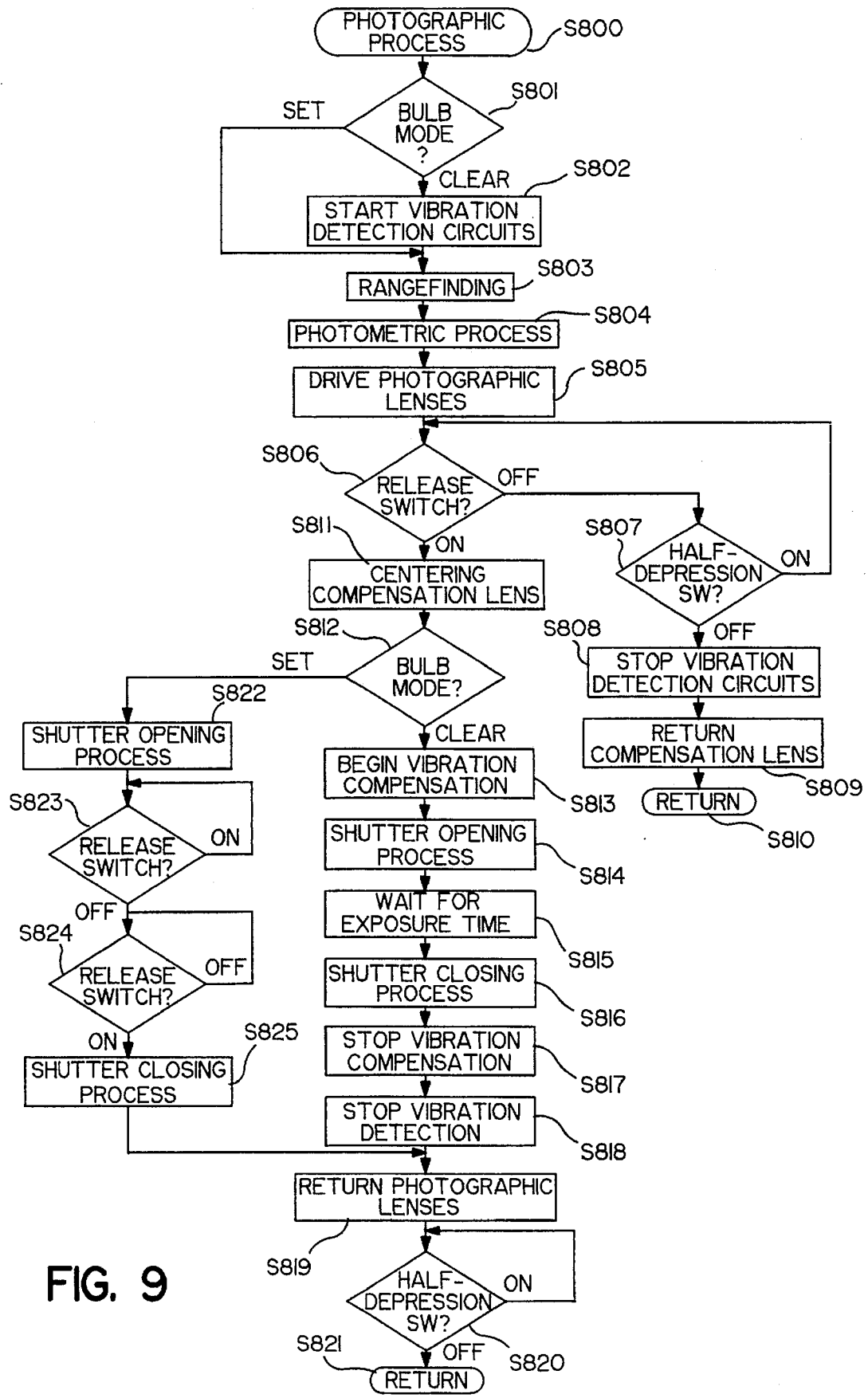
FIG. 9 is a flow chart showing an operational process corresponding to the photographic process of step S205 of FIG. 8 in accordance with the third embodiment of the present invention.

FIG. 9 is a flow chart showing an operational process according to the photographic process of step S205 of FIG. 8 in accordance with the third embodiment of the present invention. The photographic process begins in step S800, and it is then determined (step S801) whether or not the bulb mode has been set. When the bulb mode has been cleared, the vibration detection circuits 3 and 4 are started (step S802). The vibration detection circuits 3 and 4 are not started directly before the vibration compensation process (step S813), but are started at this stage, because by starting the vibration detection circuits 3 and 4 early, the vibration detection circuits 3 and 4 stabilize.

Further, when the bulb mode is set in step S801, the operational process proceeds to step S803, by-passing step S802. In this manner, the vibration detection circuits 3 and 4 are not staffed when in the bulb mode. There is no operation of the vibration detection circuits 3 and 4 because in the bulb mode the camera is generally fixed on a tripod or like device for fixing a camera, and the probability of vibration arising is very small. Since the probability of vibration is small, a vibration compensation process is not performed and there is no electric current consumption by the vibration detection circuits 3 and 4.

In step S806 it is determined whether the release switch 17 is ON. If the release switch 17 is ON, the process of centering the compensation lens 11 is performed (step S811). Specifically, the compensation lens 11 is moved to a standard position of the optical axis center. Accordingly, when in the bulb mode a centering process of the compensation lens 11 is performed, and a vibration compensation process is not performed. The centering process is performed because the initial position of the compensation lens 11 is displaced from the optical axis center, and photography is performed after driving the compensation lens 11 to the standard position of the optical axis center. Accordingly, because of the centering process, good photographic results are obtained when in the bulb mode.

Next, it is determined whether or not bulb mode is set (step S812). When the release switch 17 is ON, and the bulb mode is not set, normal photography is begun in step S813. Specifically, the vibration compensation process is commenced in step S813, and based on the output results of the vibration detection circuits 3 and 4, the compensation lens 11 is moved in a direction approximately at right angles to the optical axis to negate the detected vibration. Next, a shutter opening and closing operation is performed. The shutter is opened in step S814, and after waiting for a predetermined exposure time (step S815) based on the photometric result of step S804, the shutter is closed (step S816). The vibration compensation process is then stopped (step S817). In step S818, the operation of the vibration detection circuits 3 and 4 is stopped, and the operational process proceeds to step S819.

However, when the release switch 17 is ON in step S806, and when the bulb mode is set (step S812), the operational process proceeds to step S822, and photography is performed in the bulb mode. A shutter opening process is performed in step S822, then proceeding to step S823, it is determined when the release switch 17, which was ON in step S806, becomes OFF. When the release switch 17 is switched OFF, the operational process proceeds to step S824 where it is waited until the release switch 17 is switched ON. The open state of the shutter is maintained through steps S823 and S824. When the release switch 17 again becomes ON, the shutter is closed (step S825) and the operational process proceeds to step S819.

In step S819, the photographic lens system 9–12 is returned to its initial position on the optical axis (return process), and further, the compensation lens 11 returns to its initial position at the end portion of its drive range. Next in step S820, when the OFF state of the half-depression switch 16 is recognized, the operational process returns (step S821) to the flow chart of FIG. 8.

Figure 10:
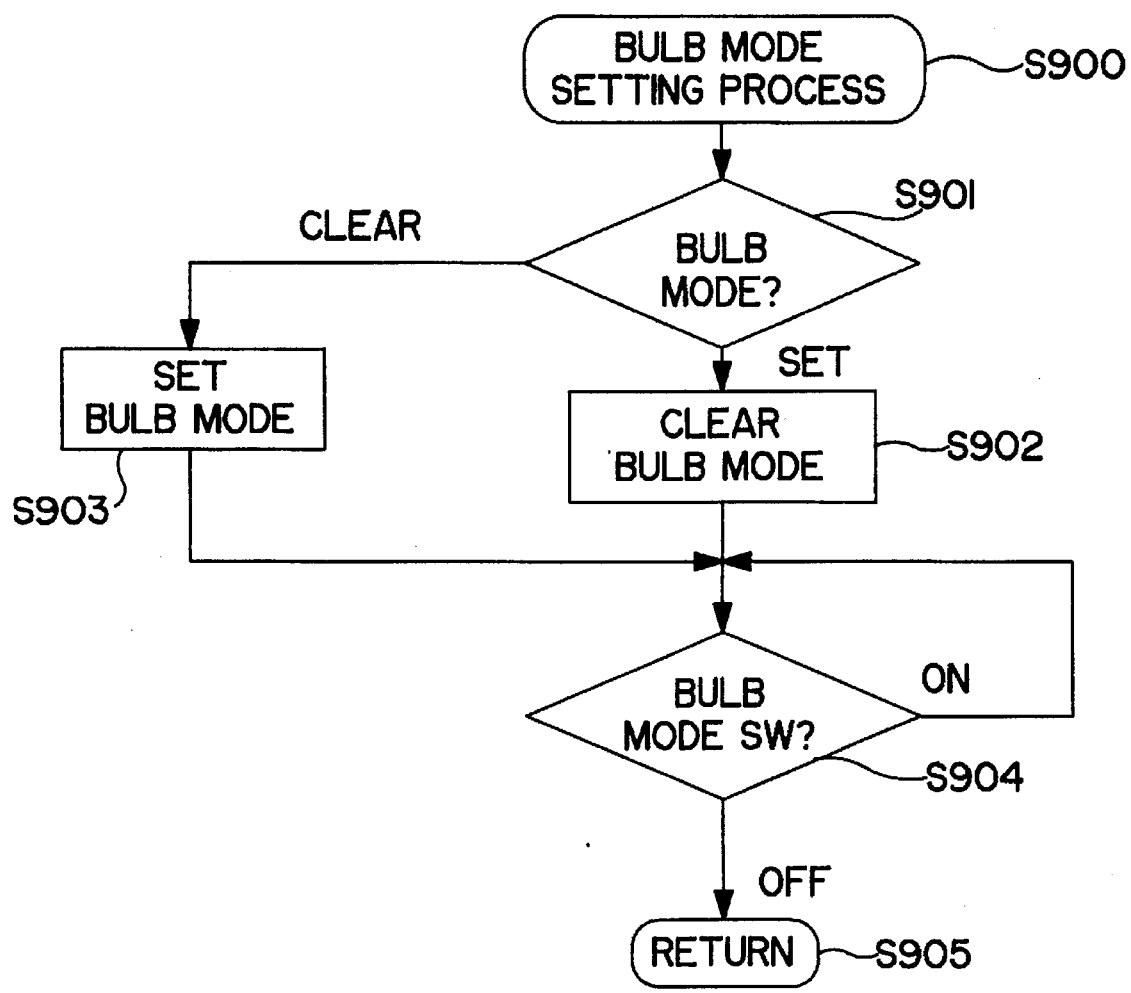
FIG. 10 is a flow chart showing an operational process corresponding to the bulb mode setting process performed in step S206 of FIG. 8 in accordance with the third embodiment of the invention.

FIG. 10 is a flow chart showing an operational process corresponding to the bulb mode setting process performed in step S706 of FIG. 8 in accordance with the third embodiment of the present invention. The bulb mode setting processing begins in step S900 and, in step S901 it is determined whether or not the bulb mode has already been set. When the bulb mode has already been set, the bulb mode is cleared (step S902). On the other hand, when it is determined that the bulb mode is cleared in step S901, the bulb mode is then set in step S903. Specifically, when the bulb mode switch 21 is ON, and the bulb mode has already been set, the bulb mode is cleared; when the bulb mode is cleared in S901, the bulb mode is then set. Next, proceeding to step S904, when it is recognized that the bulb mode switch 21 is OFF, the operational process returns from step S905 to the flow chart of FIG. 8.

It will be recognized that the third embodiment of the present invention is not limited to that described above, and various modifications can be made without departing from the spirit and scope of the invention. For example, in accordance with the third embodiment, a photographic process in the bulb mode has been described wherein the compensation lens 11 is centered before a shutter opening and closing process. Similarly, the process of centering the compensation lens 11 may be performed when adjusting the optical system in the bulb mode.

In accordance with the third embodiment of the present invention, as described above, when the bulb mode is set, because the vibration compensation system is not operated, electric current consumption of the camera can be restrained, and furthermore, heat generated by the vibration compensation circuits is minimized. Furthermore, when the bulb mode is set, because the vibration compensation lens is moved to the approximate center of the optical axis, good photographic results can be obtained during photography in the bulb mode, and adjustment and the like of the optical system can be accurately performed in the bulb mode.

Although preferred embodiments of the invention have been shown and described, it will be appreciated by those skilled in the art that changes may be made in these embodiments without departing from the principles and spirit of the invention, the scope of which is defined in the claims and their equivalents.

What is claimed is:

1. A camera, comprising:
   a vibration compensation system to compensate for image vibration, the vibration compensation system including a vibration compensation lens which is movable in a direction approximately perpendicular to an optical axis direction to compensate for image vibration,
   a vibration compensation drive to drive the vibration compensation lens in a direction approximately perpendicular to the optical axis direction to compensate for image vibration, and
   a centering device to move the vibration compensation lens from an initial position to a position approximately centered on the optical axis;
   a delay mode setting device to set a timed delay mode to perform an exposure operation a predetermined time after a release operation; and
   a control unit to inhibit operation of the vibration compensation system, except the centering device, and to control the centering device to move the vibration compensation lens to the position approximately centered on the optical axis prior to the exposure operation in response to the delay mode setting device setting the timed delay mode.

2. A vibration compensation camera as recited in claim 1, wherein the vibration compensation system further comprises a vibration detection circuit to detect camera vibration, and the control unit controls the vibration detection circuit such that the vibration detection circuit is not operated when the delay mode setting device is set to the timed delay mode.

3. A vibration compensation camera as recited in claim 1, further comprising a camera shutter, wherein the delay mode setting device sets a predetermined delay after which a shutter opening is performed.

4. A camera, comprising:
   a vibration compensation system to correct image vibration caused by camera vibration, the vibration compensation system including a vibration compensation lens which is moved to correct image vibration;
   a changeover device to allow a camera operator to select a mode of camera operation in which the vibration compensation system is not operated;
   a centering device to move the vibration compensation lens from an initial position to a position approximately centered on the optical axis; and
   a control unit to control the centering device to move the vibration compensation lens to the position approximately centered on the optical axis when the mode of camera operation in which the vibration compensation system is not operated is selected.

5. A vibration compensation camera as recited in claim 4, wherein the vibration compensation system comprises a vibration detection circuit to detect camera vibration, and the control unit controls the vibration detection circuit such that the vibration detection circuit is not operated when the changeover device selects the mode of camera operation in which the vibration compensation system is not operated.

6. A vibration compensation camera, comprising:
   a vibration compensation system to compensate for image vibration caused by camera vibration;
   a bulb mode setting device to set a bulb mode to maintain a shutter in an open state; and
   a control unit to control the vibration compensation system such that, when the bulb mode setting device is set to the bulb mode, the vibration compensation system is not operated.

7. A vibration compensation camera as recited in claim 6, wherein the vibration compensation system comprises:
   a vibration compensation lens which is moved in a direction approximately at right angles to an optical axis direction to compensate for image vibration caused by camera vibration; and
   a centering device to move the vibration compensation lens from an initial position to a position approximately centered on the optical axis,
   wherein the control unit controls the vibration compensation system such that the centering device moves the vibration compensation lens to the position approximately centered on the optical axis prior to the exposure operation in response to the bulb mode setting device setting the bulb mode.

8. A vibration compensation camera as recited in claim 6, wherein the vibration compensation system comprises a vibration detection circuit to detect camera vibration, wherein the control unit controls the vibration detection circuit such that the vibration detection circuit is not operated when the bulb mode setting device is set to the bulb mode.

9. A vibration compensation camera, comprising:
   a vibration compensation system to compensate for image vibration caused by camera vibration;
   a vibration detection circuit to detect camera vibration;
   a delay mode setting device to set a timed delay to perform an exposure operation a predetermined time after a release operation; and
   a control unit to start the vibration detection circuit after a first delay time has elapsed after the release operation when the delay mode setting device is set to the timed delay mode, and to begin a vibration compensation operation after a second delay time has elapsed after the vibration detection circuit is started.

10. A vibration compensation camera as recited in claim 9, wherein the second time delay is shorter than the first time delay.

11. A vibration compensation camera as recited in claim 9, wherein the second time delay is a time for stabilization of the vibration detection circuit.

12. A vibration compensation camera as recited in claim 9, further comprising a timing unit which times the first delay time and the second delay time.

13. A vibration compensation camera, comprising:
   a power supply to supply power to camera components;
   a vibration detection circuit to detect camera vibration;
   a vibration compensation system to compensate for image vibration caused by camera vibration in accordance with the vibration detected by the vibration detection circuit; and
   a mode setting device to set a camera mode wherein power is not supplied to the vibration detection circuit and vibration compensation is not performed during photography.

14. A vibration compensation camera as recited in claim 13, wherein the mode setting device is a bulb mode setting device to set a bulb mode, wherein power is not supplied to the vibration detection circuit and the vibration compensation system does not operate when the bulb mode is set.

* * * * *